(12) United States Patent
Kim et al.

(10) Patent No.: US 8,640,470 B2
(45) Date of Patent: Feb. 4, 2014

(54) CONTROL METHOD OF REFRIGERATOR

(75) Inventors: Dong-Seok Kim, Gangwon-Do (KR);
Sung-Hee Kang, Gyeongsangnam-Do (KR); Jong-Min Shin, Busan (KR);
Chulgi Roh, Gyeongsangnam-do (KR);
Deok-Hyun Youn, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 757 days.

(21) Appl. No.: 12/747,398

(22) PCT Filed: Nov. 4, 2008

(86) PCT No.: PCT/KR2008/006500
§ 371 (c)(1),
(2), (4) Date: Nov. 9, 2010

(87) PCT Pub. No.: WO2009/061121
PCT Pub. Date: May 14, 2009

(65) Prior Publication Data
US 2011/0041525 A1 Feb. 24, 2011

(30) Foreign Application Priority Data
Nov. 5, 2007 (KR) .................. 10-2007-0112370

(51) Int. Cl.
*F25D 17/06* (2006.01)

(52) U.S. Cl.
USPC ................... 62/89; 62/193; 62/238.1

(58) Field of Classification Search
USPC .......... 62/89, 180, 276, 238.1, 86, 176.3, 193
See application file for complete search history.

U.S. PATENT DOCUMENTS

| 2,765,630 | A | * | 10/1956 | Shaw | ............... | 62/202 |
| 5,582,233 | A | * | 12/1996 | Noto | ............... | 165/247 |
| 5,918,474 | A | | 7/1999 | Khanpara et al. | | |
| 2002/0144510 | A1 | | 10/2002 | Park et al. | | |

(56) References Cited

FOREIGN PATENT DOCUMENTS

| DE | 10260350 A1 | 1/2004 |
| JP | 2000258023 A | 9/2000 |
| JP | 2006125839 A | 5/2006 |

OTHER PUBLICATIONS

International Search Report dated Apr. 30, 2010 for Application No. PCT/KR2008/006500, 3 pages.

* cited by examiner

*Primary Examiner* — Melvin Jones
(74) *Attorney, Agent, or Firm* — Fish & Richardson P.C.

(57) ABSTRACT

The present invention relates to a control method of a refrigerator which operates a cooling cycle including two storage compartments, a compressor, a condenser, a valve, fans, and evaporators for cooling the respective storage compartments, with one of the fans (5) corresponding to the storage compartment for storing items at relatively low temperatures being activated for a set amount of time even after the compressor is deactivated at the completion of cooling of the storage compartment for storing items at relatively low temperatures. In a refrigerator comprising a first storage compartment for storing an item, a second storage compartment for storing an item at a lower temperature than the first storage compartment, a cooling cycle including a compressor, a condenser for condensing a refrigerant from the compressor, a valve for directing the refrigerant from the condenser to first and second evaporators, with the first and second evaporators evaporating supplied refrigerants to cool the first and second storage compartments, respectively, and first and second (5) fans for circulating cool air from the first and second evaporators, respectively, and a controller for controlling the first and second (5) fans, the valve and the compressor, a control method of the refrigerator comprising: a first step of the controller activating the compressor if cooling of the second storage compartment is required and activating the second fan (5); and a second step of the controller deactivating the operation of the compressor, if the cooling of the second storage compartment is completed, and deactivating the operation of the second fan (5) after the operation of the compressor is deactivated.

22 Claims, 3 Drawing Sheets

CONTROL METHOD OF REFRIGERATOR

CROSS-REFERENCE TO RELATED APPLICATIONS

This utility application is a filing under 35 U.S.C. §371, and claims the benefit of priority to international patent application number PCT/KR2008/006500 filed Nov. 4, 2008, which claims priority to Korean Patent Application No. 10-2007-0112370, filed on Nov. 5, 2007, the contents of which are incorporated by reference in their entirety.

TECHNICAL FIELD

The present invention relates in general to a control method of a refrigerator, and more particularly, to a control method of a refrigerator which operates a cooling cycle including two storage compartments, a compressor, a condenser, a valve, fans, and evaporators for cooling the respective storage compartments, with one of the fans corresponding to the storage compartment for storing items at relatively low temperatures being activated for a set amount of time even after the compressor is deactivated at the completion of cooling of the storage compartment for storing items at relatively low temperatures.

BACKGROUND ART

FIG. 1 is an explanatory view of a cooling cycle used in refrigerators according to the prior art. The cooling cycle includes a compressor 1, a condenser 2, a valve 3, fans 4 and 5, evaporators 6 and 7, a controller 8, and expansion means 9 and 10. The compressor 1 compresses refrigerants into high-temperature, high-pressure gaseous refrigerants, and the condenser 2 condenses the refrigerants having passed through the compressor to high-temperature, high-pressure liquid refrigerants. The valve 3 controls a refrigerant flow into the evaporator 6 of a high-temperature section and the evaporator 7 of a low-temperature section, and a 3-way valve having one inlet and two outlets is typically used. Hereinafter, an evaporator and a fan corresponding to a storage compartment that stores objects at high temperature will be referred to as a high temperature evaporator and a high temperature fan, respectively. Similarly, an evaporator and a fan corresponding to a storage compartment that stores objects at low temperature will be referred to as a low temperature evaporator and a low temperature fan, respectively. When a refrigerant is sent to the high temperature evaporator 6, the high temperature fan 4 starts running thereby cooling an upper storage compartment. Likewise, when a refrigerant is sent to the low temperature evaporator 7, the low temperature fan 5 starts running thereby cooling a lower storage compartment. That is, the high temperature fan 4 has a role in circulating cool air generated from the high temperature evaporator 6 into the high temperature storage compartment, and the low temperature fan 5 has a role in circulating cool air generated from the low temperature evaporator 7 into the low temperature storage compartment.

FIG. 2 graphically explains a control method of a parallel-type refrigerator according to the prior art. According to the graph, from t0 to t1 and from t2 to t3, a storage compartment for storing items at high temperature and a storage compartment for storing items at low temperature do not need to be cooled, so the high temperature fan 4 and the low temperature fan 5 are not running and the compressor 1 is also deactivated. Depending on the type of refrigerator, even if a cooling operation is not required, the fans may be turned ON/OFF automatically with a preset cycle so as to maintain a uniform temperature in the storage compartments. From t1 to t2, the high temperature storage compartment needs to be cooled off so the high temperature fan 4 is activated; from t3 and t4, the low temperature storage compartment needs to be cooled off so the low temperature fan 5 is activated.

In conventional refrigerators, the low temperature evaporator is set to −25~−29° C., and the high temperature evaporator is set to −16~−20° C. In order to cool the high temperature storage compartment at the completion of cooling of the low temperature storage compartment (t4 in FIG. 2), refrigerants in the low temperature evaporator 7 must be taken into the compressor 1 again and eventually to the high temperature evaporator 6 via the condenser 2. However, when the fan is operated in this manner, refrigerants stay in the low temperature evaporator 7 because the low temperature fan 5 at t4 is not activated. Without the low temperature fan 5 in operation mode, an amount of heat being exchanged between the low temperature evaporator and the low temperature storage compartment is not much. This leads to an increase of temperature difference between the low temperature evaporator and the high temperature evaporator, and a pressure in the low temperature evaporator becomes much lower than a pressure in the high temperature evaporator, eventually impeding a smooth flow of refrigerants from the low temperature evaporator to the high temperature evaporator. That is to say, when cooling of the high temperature storage compartment is initiated (t5 in FIG. 2) at the end of cooling of the low temperature storage compartment, refrigerants do not move sufficiently to the high temperature evaporator 6, thereby interrupting the performance of a smooth cooling operation.

DISCLOSURE OF INVENTION

Technical Problem

The present invention is conceived to solve the aforementioned problems in the prior art. An object of the present invention is to improve cooling efficiency, by activating a fan at the completion of cooling of the low temperature storage compartment to facilitate the circulation of refrigerants and increase the temperature of the low temperature evaporator.

Another object of the present invention is to improve cooling efficiency, by activating a fan at the completion of cooling of the low temperature storage compartment to reduce a temperature difference and a pressure difference between the low temperature evaporator and the high temperature evaporator, thereby facilitating the circulation of refrigerants.

Technical Solution

According to an aspect of the present invention, in a refrigerator comprising a first storage compartment for storing an item, a second storage compartment for storing an item at a lower temperature than the first storage compartment, a cooling cycle including a compressor, a condenser for condensing a refrigerant from the compressor, a valve for directing the refrigerant from the condenser to first and second evaporators, with the first and second evaporators evaporating supplied refrigerants to cool the first and second storage compartments, respectively, and first and second fans for circulating cool air from the first and second evaporators, respectively, and a controller for controlling the first and second fans, the valve and the compressor, a control method of the refrigerator comprising: a first step of the controller activating the compressor if cooling of the second storage compartment is required and activating the second fan; and a second step of the controller deactivating the operation of the compressor, if the cooling of the second storage compartment is completed, and deactivating the operation of the second fan after the operation of the compressor is deactivated.

Preferably, in the second step, the controller deactivates the operation of the second fan, if a temperature difference between the first evaporator and the second evaporator sensed by a sensing unit is below a predetermined level.

Preferably, in the second step, the controller deactivates the operation of the second fan, after elapse of a preset time from the deactivation of the compressor.

In the control method, the first step preferably includes a step of deciding whether the second storage compartment needs to be cooled off.

Another aspect of the present invention provides a refrigerator, which comprises: a first storage compartment for storing an item and a second storage compartment for storing an item at a lower temperature than the first storage compartment; a cooling cycle including a compressor, a condenser for condensing a refrigerant from the compressor, a valve for directing the refrigerant from the condenser to first and second evaporators, with the first and second evaporators evaporating supplied refrigerants to cool the first and second storage compartments, respectively, and first and second fans for circulating cool air from the first and second evaporators, respectively; and a controller for performing a cooling operation on each of the first and second storage compartments and, after the cooling of the second storage compartment is completed, immediately deactivating the operation of the compressor and then deactivating the operation of the second fan after the operation of the compressor is deactivated.

Preferably, the refrigerator further includes sensing units for sensing temperatures of the first and second evaporators.

Moreover, if the cooling of the second storage compartment is completed, the controller deactivates the operation of the compressor immediately and then deactivates the operation of the second fan if a temperature difference between the first evaporator and the second evaporator sensed by the sensing unit is below a predetermined level.

Advantageous Effects

The refrigerant control method in accordance with the present invention can effectively perform a cooling operation by activating a fan at the completion of cooling of the low temperature storage compartment to facilitate the circulation of refrigerants and increase the temperature of the low temperature evaporator.

Moreover, the refrigerant control method in accordance with the present invention can effectively perform a cooling operation by activating a fan at the completion of cooling of the low temperature storage compartment to reduce a temperature difference and a pressure difference between the low temperature evaporator and the high temperature evaporator, thereby facilitating the circulation of refrigerants.

MODE FOR THE INVENTION

Hereinafter, preferred embodiments of the present invention will be described in detail with reference to the accompanying drawings.

Figure 1:
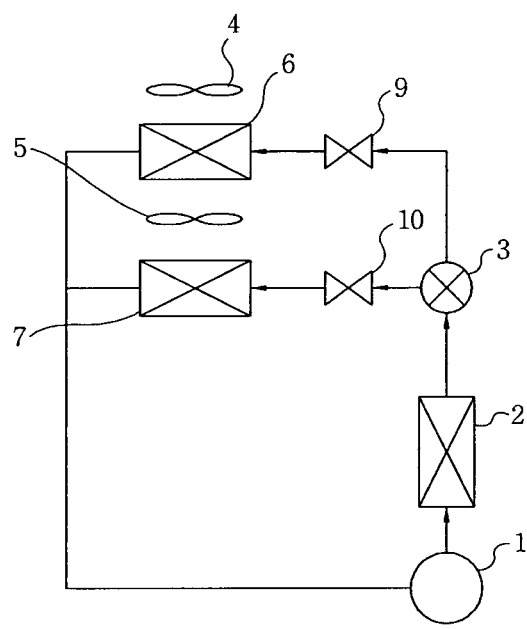
FIG. 1 is an explanatory view of a cooling cycle used in refrigerators according to the prior art.
Figure 2:
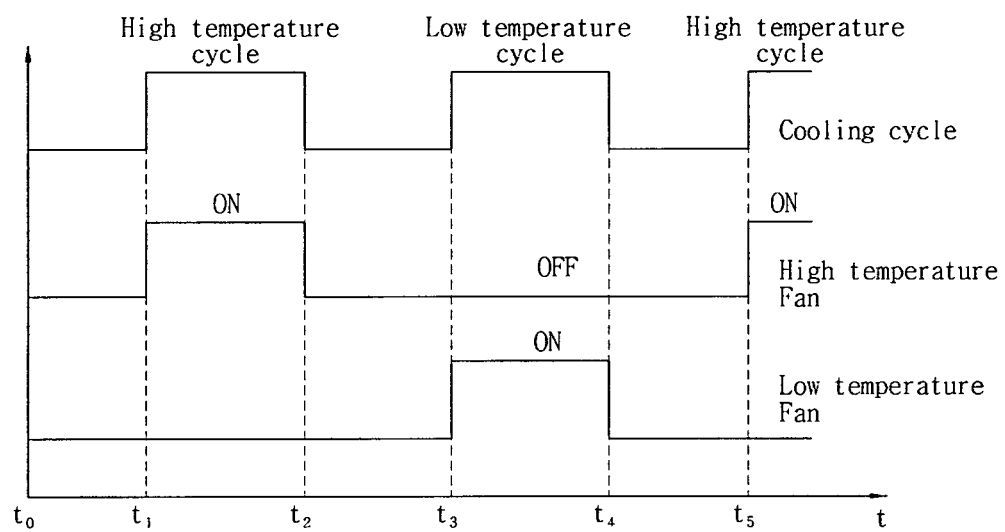
FIG. 2 graphically explains a control method of a parallel-type refrigerator according to the prior art.
Figure 3:
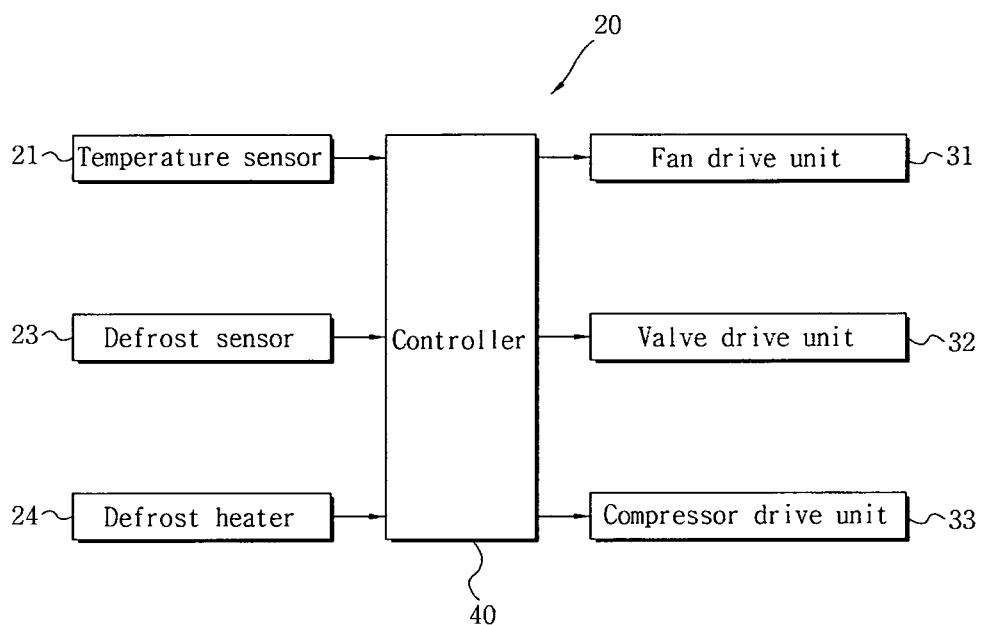
FIG. 3 is a schematic view for explaining a control method of a refrigerator according to the present invention.

FIG. 3 is a schematic view for explaining a control method of a refrigerator according to the present invention. Referring to FIG. 1 and FIG. 3, a refrigerator 20 includes temperature sensors 21 for measuring the temperature of a high temperature evaporator 6, the temperature of a low temperature evaporator 7, and the interior temperatures of high temperature storage compartment and low temperature storage compartment, a defrost sensor 23 for sensing whether the high temperature evaporator 6 and the low temperature evaporator 7 have been frosted, a defrost heater 24 for applying heat to defrost the evaporators 6 and 7 if they have been frosted, a fan drive unit 31 for activating a high temperature fan 4 or a low temperature fan 5, a valve drive unit 32 for adjusting a valve 3 to direct refrigerants towards the high temperature evaporator 6, or direct refrigerants towards the low temperature evaporator 7, or block both passages, a compressor drive unit 33 for activating or deactivating a compressor 1, and a controller 40 for controlling the fan drive unit 31, the valve drive unit 32 and the compressor drive unit 33, based on information received from the temperature sensors 21 and the defrost sensor 23.

The temperature sensors 21, each of which is mounted on inner wall surface of the high temperature storage compartment and the low temperature storage compartment, sense the interior temperature of the compartments, respectively, and provide the temperature measurement to the controller 40. In addition, the temperature sensors 21 may sense the temperatures of the high- and low-temperature evaporators 6 and 7 and provide the temperature measurement to the controller 40. Sensing the interior temperature of the refrigerator or the evaporator can be done under a command of the controller 40, or may be done automatically at fixed time intervals.

The defrost sensor 23 can be implemented in the form of a sensor with a variable resistance in response to the temperature of the high temperature evaporator 6 or the low temperature evaporator 7. The controller 40 receives a signal corresponding to a resistance that varies depending on the temperature of the high temperature evaporator 6 or the low temperature evaporator 7, for deciding whether either one should be defrosted.

The defrost heater 24, at an activation command from the controller 40, removes frost from the high temperature evaporator 6 or the low temperature evaporator 7 by applying heat to the corresponding evaporator. With the supply of heat, the frost having been produced when water vapor around the high temperature evaporator 6 or the low temperature evaporator 7 condenses and deposited on the surface melts or is evaporated to disappear.

The fan drive unit 31, at an activation command from the controller 40, activates the high temperature fan 4 or the low temperature fan 5. In normal case, the fan is activated when refrigerants are fed to an evaporator corresponding to the fan, or is deactivated when no refrigerant is fed to the evaporator corresponding to the fan, or is repeatedly activated and deactivated at regular time intervals for the distribution of the interior temperature.

The valve drive unit 32 regulates the operation of the valve 3, more specifically, it enables refrigerants to flow to the high temperature evaporator 6 or the low temperature evaporator 7, or to block the flow of refrigerants, in response to a command from the controller 40.

The compressor drive unit 33 activates the compressor and determines whether to activate or deactivate the compressor, in response to a signal from the controller 40.

The controller 40 receives a temperature input from each temperature sensor 21. It should be understood that the controller 40 has a timer. The controller compares the temperature input with a set temperature that is predetermined for the high temperature storage compartment or a set temperature that is predetermined for the low temperature storage compartment so as to decide the necessity for cooling of each storage compartment. Furthermore, the controller 40 may also decide the necessity for cooling of each storage compartment at pre-set times. In conformity with the decision on cooling the controller 40 sends an activation command to the valve drive unit 32 to direct or block the flow of refrigerants to the high temperature evaporator 6 and/or the low temperature evaporator 7. If cooling is required, the controller 40 sends an activation signal to the compressor drive unit 33 to activate the compressor. In addition, if the high temperature storage compartment needs to be cooled off, the controller 40 sends an activation command to the fan drive unit 31 to activate the high temperature fan 4. Likewise, if the low temperature storage compartment needs to be cooled off, the controller 40 sends an activation command to the fan drive unit 31 to activate the low temperature fan 5. In this manner, heat exchange can be performed readily and effectively to cool the items stored in the storage compartment(s) quickly.

When the operation of the compressor is deactivated at the completion of cooling of the low temperature storage compartment, the controller 40 can decide whether to activate or deactivate the low temperature fan 5. In detail, even if the operation of the compressor 1 is deactivated, the controller 40 lets the low temperature fan 5 operate further, and then it deactivates the low temperature fan 5 if a temperature difference between the high temperature evaporator 6 and the low temperature evaporator 7 becomes below a prestored value in the controller 40. This control is made possible based on the information on temperatures of the high- and low-temperature evaporators 6 and 7 that are delivered from the temperature sensors 21 to the controller 40. Also, after elapse of the preset time from the deactivation of the compressor 1 at the end of cooling of the low temperature storage compartment, the controller 40 can deactivate the low temperature fan 5. This is made possible by starting or stopping a timer which is built in the controller 40.

Moreover, the controller 40 receives a defrost signal from the defrost sensor 23 and compares the current conditions of an evaporator of interest with the prestored defrost conditions (e.g., reference voltage, reference current, etc.). If defrost needs to be initiated, the controller 40 sends an activation signal to the defrost heater 24 to get rid of frost on the evaporator.

Figure 4:
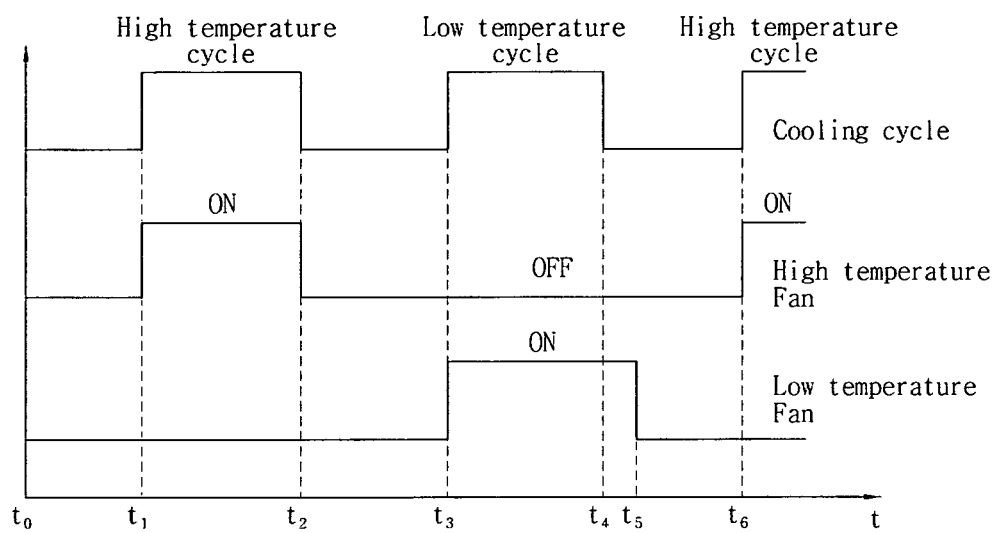
FIG. 4 graphically explains a control method of a refrigerator according to the present invention.

FIG. 4 graphically explains a control method of a refrigerator according to the present invention. Since a temperature difference and a pressure difference between the low temperature evaporator 7 and the high temperature evaporator 6 impede the smooth flow of refrigerants to the high temperature evaporator 6, it is necessary to increase the temperature of the low temperature evaporator 7 to resolve the concern. To be more specific, when cooling of the low temperature storage compartment is over (t4 in FIG. 4), the controller 40 sends a drive signal to the fan drive unit 31 to operate the low temperature fan 5 for a preset amount of time so as to activate heat exchange between the low temperature evaporator 7 and the low temperature storage compartment.

From t0 to t1 and from t2 to t3, wherein the storage compartment for storing items at high temperature and the storage compartment for storing items at low temperature do not need to be cooled off, the controller 40 does not transmit any drive signal to the fan drive unit 31 so the high temperature fan 4 and the low temperature fan 5 remain deactivated, which is same as that in the prior art. What happens from t1 to t2 and from t3 to t4 is also same as that in the prior art. At the point where cooling of the low temperature section is over (t4 in FIG. 4) part of the cooling cycle, that is, the operation involving the compressor 1 and the low temperature evaporator 7, may stop, the low temperature fan 5 continues its operation to facilitate heat exchange. This control is made possible as the controller 40 sends signals to the fan drive unit 31 and the compressor drive unit 33, respectively. With the low temperature fan 5 operating to activate heat exchange, a temperature difference between the low temperature evaporator 7 and the high temperature evaporator 6 can be reduced. Later at t6, wherein cooling of the high temperature storage compartment is reinitiated, refrigerants in the low temperature evaporator 7 can readily flow to the compressor 1, the condenser 2, the valve 3, and finally the high temperature evaporator 6.

When a temperature difference between the high temperature evaporator 6 and the low temperature evaporator 7 goes below a predetermined level, the temperature sensor 21 detects such change and provides the sensed result to the controller 40. Then the controller sends a signal to the fan drive unit 31 to deactivate the operation of the low temperature fan 5 so as to ensure a certain degree of a smooth flow of refrigerants. In addition, the controller 40 may deactivate the operation of the low temperature fan 5, after preset time has elapsed from the deactivation of the compressor 1.

Figure 5:
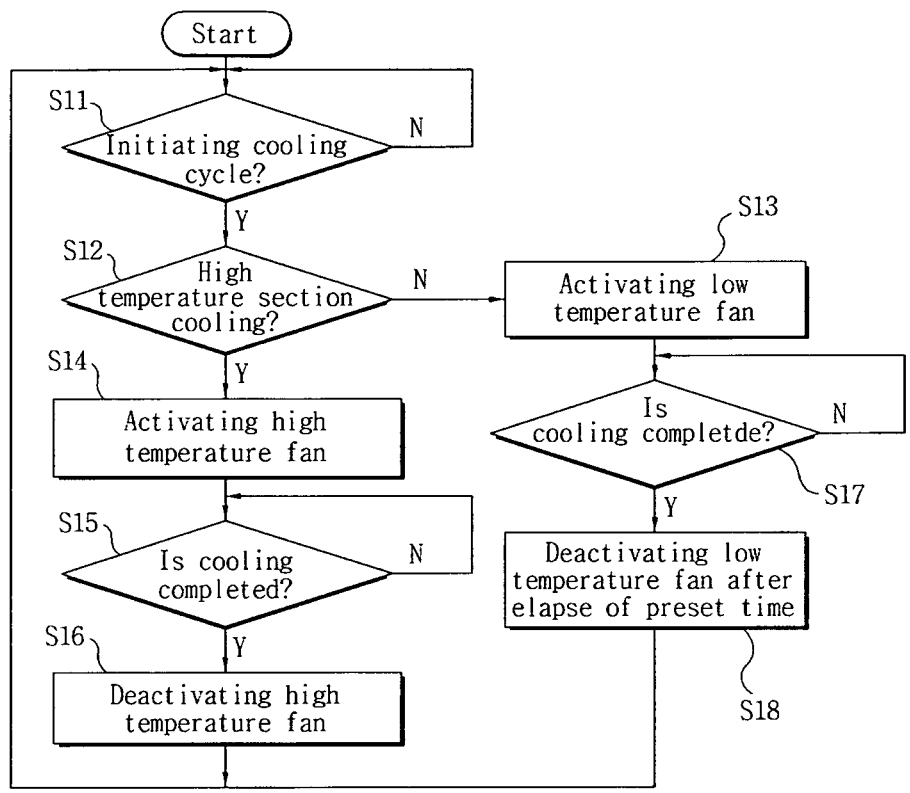
FIG. 5 is a flow chart explaining a control method of a refrigerator according to the present invention.

FIG. 5 is a flow chart explaining a control method of a refrigerator according to the present invention.

In step S11, if it is decided that a cooling cycle needs to be performed, the next step S12 proceeds; if it is decided that a cooling cycle does not need to be performed, the decision step S11 is repeated. The controller 40 decides whether a cooling cycle needs to be performed by checking if the temperature in the high temperature storage compartment or the temperature in the low temperature storage compartment is higher than a reference level, or by operating the cooling cycle automatically at preset times. If the controller decides that the cooling cycles does not need to be performed, the fans 4 and 5 and the compressor 1 will not operate.

In step S12, it is decided if a high temperature section needs to be cooled off. If the high temperature storage compartment needs to be cooled off, step S14 is carried out, but if the low temperature storage compartment needs to be cooled off, step S13 is carried out. Since the cooling cycle should be performed in either case, the compressor 1 and the condenser 2 are activated.

In step S13, since the low temperature storage compartment needs to be cooled off, the controller 40 sends a drive signal to the fan drive unit 31 to activate the low temperature fan 5, thereby allowing heat exchange between the low temperature evaporator 7 and the low temperature storage compartment (from t3 to t4 in FIG. 4).

In step S14, since the high temperature storage compartment needs to be cooled off, the controller 40 sends a drive signal to the fan drive unit 31 to activate the high temperature fan 4, thereby allowing heat exchange between the high temperature evaporator 6 and the high temperature storage compartment (from t1 to t2 in FIG. 4).

In step S15, the controller decides whether cooling of the high temperature storage compartment has been completed and if so, step S16 is carried out. If cooling has not been completed, however, step S15 is repeated, with the high temperature fan 4 still operating continuously. In order to make a decision on whether cooling has been completed, the controller 40 receives information on a temperature sensed by the temperature sensor 21 and checks if the sensed temperature in the high temperature storage compartment is below the reference temperature.

In step S16, since cooling of the high temperature storage compartment has been completed, the controller 40 sends signals to the compressor drive unit 33 and the fan drive unit 31, respectively, to immediately deactivate the compressor 1 and the high temperature fan 4. As refrigerants can smoothly flow from the high temperature evaporator 6 to the low temperature evaporator 7 via the compressor 1 and the condenser 2, there is no need to have additional heat exchange between the high temperature evaporator 6 and the high temperature storage compartment.

In step S17, the controller decides whether cooling of the low temperature storage compartment has been completed and if so, step S18 is carried out. If cooling has not been completed, however, step S17 is repeated, with the low temperature fan 5 still operating continuously. In order to make a decision on whether cooling has been completed, the controller 40 receives information on a temperature sensed by the temperature sensor 21 and checks if the sensed temperature in the low temperature storage compartment is below the reference temperature.

In step S18, since cooling of the low temperature storage compartment has been completed, the compressor 1 and the low temperature fan 5 are deactivated. As noted earlier, refrigerants can smoothly flow from the low temperature evaporator 7 to the high temperature evaporator 6 only if a temperature difference between the high temperature evaporator 6 and the low temperature evaporator 7 is small, so the controller 40 activates the low temperature fan 5 through the fan drive unit 31 to facilitate heat exchange between the low temperature evaporator 7 and the low temperature storage compartment, thereby reducing a temperature difference between the high temperature evaporator 6 and the low temperature evaporator 7. That is to say, although the controller 40 immediately deactivates the compressor 1, it allows the low temperature fan 5 running a little further until the predetermined conditions are met to deactivate the low temperature fan 5.

For example, the low temperature fan 5 is deactivated when a temperature difference between the high temperature evaporator 6 and the low temperature evaporator 7 is below the reference value, or after preset time has lapsed from the deactivation of the compressor 1. Even though it is assumed, in step S18, that the operation of the low temperature fan is deactivated after elapse of the preset time, the preset condition is not limited to the elapsed time only.

After step S16 or step S18 is ended, a target storage compartment have successfully been cooled off and a fan corresponding to the storage compartment is deactivated, so step S11 is now performed again.

The present invention has been described in detail with reference to the embodiments and the attached drawings. However, the scope of the present invention is not limited to the embodiments and the drawings, but defined by the appended claims.

The invention claimed is:

1. In a refrigerator comprising a first storage compartment for storing an item, a second storage compartment for storing an item at a lower temperature than the first storage compartment, a cooling cycle including a compressor, a condenser for condensing a refrigerant from the compressor, a valve for directing the refrigerant from the condenser to first and second evaporators, with the first and second evaporators evaporating supplied refrigerants to cool the first and second storage compartments, respectively, and first and second fans for circulating cool air from the first and second evaporators, respectively, and a controller for controlling the first and second fans, the valve and the compressor, a control method of the refrigerator comprising:

a first step of the controller activating the compressor if cooling of the second storage compartment is required and activating the second fan; and a second step of the controller deactivating the operation of the compressor, if the cooling of the second storage compartment is completed, and deactivating the operation of the second fan after the operation of the compressor is deactivated;

wherein the second step includes the controller deactivating the operation of the second fan, if a temperature difference between the first evaporator and the second evaporator sensed by a sensing unit is below a predetermined level.

2. The control method according to claim 1, wherein the second step includes the controller deactivating the operation of the second fan, after elapse of a preset time from the deactivation of the compressor.

3. The control method according to claim 1, wherein the first step includes a step of:

deciding whether the second storage compartment needs to be cooled off.

4. A refrigerator, comprising:

a first storage compartment for storing an item and a second storage compartment for storing an item at a lower temperature than the first storage compartment;

a cooling cycle including a compressor, a condenser for condensing a refrigerant from the compressor, a valve for directing the refrigerant from the condenser to first and second evaporators, with the first and second evaporators evaporating supplied refrigerants to cool the first and second storage compartments, respectively, first and second fans for circulating cool air from the first and second evaporators, respectively; and a controller for performing a cooling operation on each of the first and second storage compartments and, after the cooling of the second storage compartment is completed, immediately deactivating the operation of the compressor and then deactivating the operation of the second fan after the operation of the compressor is deactivated;

wherein, if the cooling of the second storage compartment has been completed, the controller deactivates the operation of the compressor immediately and then deactivates the operation of the second fan if a temperature difference between the first evaporator and the second evaporator sensed by the sensing unit is below a predetermined level.

5. The refrigerator according to claim 4, comprising:

sensing units for sensing temperatures of the first and second evaporators.

6. The refrigerator according to claim 4, wherein the controller comprises:
a timer for checking elapsed time to decide if cooling has been completed.

7. The refrigerator according to claim 4, comprising:
a defrost sensor for sensing whether the first evaporator and/or the second evaporator is frosted.

8. The refrigerator according to claim 7, wherein the defrost sensor is a sensor having a variable resistance in response to temperatures in high- and low-temperature evaporators.

9. The refrigerator according to claim 7, comprising:
a defrost heater for applying heat to the evaporators to get rid of frost generated thereon.

10. The control method according to claim 1, wherein the second step includes the controller deactivating the operation of the second fan, after elapse of a preset time from the deactivation of the compressor.

11. The control method according to claim 1, wherein the first step includes a step of:
deciding whether the second storage compartment needs to be cooled off.

12. The control method according to claim 2, wherein the first step includes a step of:
deciding whether the second storage compartment needs to be cooled off.

13. The refrigerator according to claim 5, wherein the controller comprises:
a timer for checking elapsed time to decide if cooling has been completed.

14. The refrigerator according to claim 5, wherein if the cooling of the second storage compartment has been completed, the controller deactivates the operation of the compressor immediately and then deactivates the operation of the second fan if a temperature difference between the first evaporator and the second evaporator sensed by the sensing unit is below a predetermined level.

15. The refrigerator according to one of claim 6, wherein if the cooling of the second storage compartment has been completed, the controller deactivates the operation of the compressor immediately and then deactivates the operation of the second fan if a temperature difference between the first evaporator and the second evaporator sensed by the sensing unit is below a predetermined level.

16. The refrigerator according to claim 5, comprising:
a defrost sensor for sensing whether the first evaporator and the second evaporator is frosted.

17. The refrigerator according to claim 6, comprising:
a defrost sensor for sensing whether the first evaporator and the second evaporator is frosted.

18. The refrigerator according to claim 4, comprising:
a defrost sensor for sensing whether the first evaporator and the second evaporator is frosted.

19. The refrigerator according to claim 8, comprising:
a defrost heater for applying heat to the evaporators to get rid of frost generated thereon.

20. The refrigerator according to claim 5, comprising:
a defrost sensor for sensing whether the first evaporator or the second evaporator is frosted.

21. The refrigerator according to claim 6, comprising:
a defrost sensor for sensing whether the first evaporator or the second evaporator is frosted.

22. The refrigerator according to claim 4, comprising:
a defrost sensor for sensing whether the first evaporator or the second evaporator is frosted.

* * * * *